3,234,185
PROCESS FOR INCREASING THE MOLECULAR WEIGHT OF AMINE-CONTAINING POLYMERS
Norman B. Rainer, North Bellmore, and Charles Kapar, Brooklyn, N.Y., assignors to Coastal Interchemical Company, Brooklyn, N.Y.
No Drawing. Filed Apr. 26, 1962, Ser. No. 190,215
5 Claims. (Cl. 260—78)

This invention relates to processes for the modification of polymer compositions, and more specifically to the production of high molecular weight polymers from amine-containing polymers of lower molecular weight.

It is an object of this invention to provide novel nitrogen-containing polymers and methods for their production.

It is another object of this invention to provide a novel process for converting amine-containing polymers into polymers of higher molecular weight.

Other objects and advantages will become apparent from the following description and claims.

The objects of this invention are accomplished in general by contacting an amine-containing polymer with a polynitrile and water at elevated temperatures in a basic reaction zone, and removing ammonia from said zone as it forms. The product thus produced is a polymer of higher molecular weight than the contacted amine-containing polymer, and contains amide groups in the polymer chain.

Suitable amine-containing polymers for the practice of this invention contain at least one non-aromatic primary or secondary amine group either directly in or attached to the polymer chain, or pendant to said chain by way of attachment to a substituent carrying group. The polymer chain consists of at least ten repetitive monomer units and has a molecular weight of at least 500. Specific types of suitable amine-containing polymers include: amine-terminated polyhexamethylene adipamide, polyethylene glycol wherein the terminal hydroxyl groups are replaced by amine groups as described in Belgian Patents 566,446 and 554,506, polymers of beta amino ethyl methacrylate, polycaprolactam, proteins, and amine-substituted polyhydrocarbons and polyesters. An especially preferred class of amine-containing polymers are linear, synthetic organic thermoplastic polymers. Also suitable are polymers containing epoxy groups, halide groups and other active groups which can be converted into amine groups by ammonia under the reaction conditions of the process of this invention. Suitable amine-containing polymers are those which contain at least one aliphatic primary or secondary amine either in the polymer chain (intralinear) or pendant to the polymer chain (extralinear) by way of attachment in a branching fashion to the chain or to a substituent group attached to the chain.

Suitable polynitriles which may be employed in the practice of this invention include aliphatic nitriles such as 1,4 dicyanobutane, 1,10 dicyanodecane and analogous species; aliphatic nitriles containing other non-interfering functional groups and elements; aromatic nitriles such as p,p¹ dicyano phenyl methane; and other equivalent species. An especially preferred class of polynitriles are poly(cyanomethylene)amines such as iminodiacetonitrile, nitrilo triacetonitrile, ethylene diamine tetra aceto nitrile, beta hydroxy ethyl iminodiaceto nitrile, and species analogous thereto.

When the polynitrile component in the reaction process of this invention contains only two nitrile groups, the reaction with the amine-containing polymer will result in chain extension of the amine-containing polymer to produce a new linear polymer having more than double the original molecular weight. These higher molecular weight polymers have greater strength and solvent resistance, and are thus more generally valuable in polymer applications. When the polynitrile component contains three or more reactive nitrile groups, cross-linking of the amine-containing polymer will occur to produce new polymers of extremely higher molecular weight and having considerably higher viscosity, solvent resistance and softening point. The higher molecular weight polymers produced by the process of this invention contain amide groups. For example, higher molecular weight polymers obtained using a poly(cyanomethylene)amine and a diamine polymer probably have the following generalized structure:

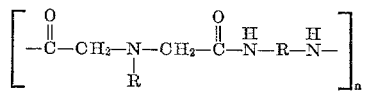

wherein R is the amine polymer chain radical, and R¹ may be any non-interfering radical, another cyanomethylene group, a radical containing other cyanomethylene amine groups, or another polymer chain similar to those occupying the other two nitrogen valences.

Although the theoretical explanation of the reaction process of this invention is not clear, it is generally found that approximately equal molar proportions of nitrile groups, water and amine groups are required to secure efficient production of high molecular weight amide polymer. However, less than 15% of the polynitrile, based on the weight of the polymer, is generally found satisfactory for the production of improved, higher molecular weight polymers. The three ingredients required in the process of this invention must be present simultaneously during the process. The reaction medium or zone must be basic to initiate and maintain the reaction. The necessary basicity is generally provided by the amine polymer or the ammonia liberated during the process; but this precludes the presence of excess strong acid, especially strong inorganic acids. In the case of the cross-linking of an amine-containing polymer, the reaction zone may be defined as the region of molecular dimensions surrounding the amine group. This region is basic in view of the amine group; and the ammonia is removed by diffusion through the polymer system away from said zone.

Temperatures in the range of 45° C. to 290° C. have generally been found satisfactory in carrying out the process of this invention. Equipment which may be employed in carrying out the process in bulk includes: closed or open vessels provided with means for heating, agitation and removal of ammonia; heated roller mills; heated ribbon blendors; and other conventional equipment employed for the mixing of heated polymer compositions. The process of this invention may however be accomplished by other means and other equipment, especially in coating applications, cross-linking reactions in a solid substrate polymer, and other applications not involving the bulk preparation of shapeable polymer. It is frequently desirable to exclude oxygen so as to avoid discoloration of the amine-containing polymer. The extent of occurrence of the process of this invention is indicated by the liberation of ammonia from the reaction mixture. The ammonia must be removed, preferably continuously, in order to maintain the progress of the chemical reaction. In situations where sealed autoclave reaction conditions are employed, the autoclave must be vented frequently to remove ammonia. Inert miscible and immiscible liquid solvents or diluents may also be employed to facilitate the reaction process. The amine-containing polymer components may contain fillers, stabilizers, pigments and other ingredients commonly incorporated into polymers. Mixtures of different suitable polynitrile and amine-containing polymer components may be employed.

The following examples serve to illustrate the invention but they are not intended to be limitative of its scope.

All parts and percentages are by weight unless otherwise indicated.

*Example I*

Five hundred parts of a low molecular weight amine-terminated hexamethylene adipamide nylon polymer which is non-fiber forming, are mixed with ten parts of iminodiacetonitrile $HN(CH_2CN)_2$ and twenty parts of water the mixture is melt blended for two hours at 260° C. in an enclosed ribbon blendor provided with a flow of moisture-saturated nitrogen gas to exclude oxygen and remove the ammonia which forms. The polymer composition gradually increases in viscosity during the heating and blending treatment, and emerges as a higher molecular weight product which can be drawn into strong fibers.

*Example II*

A shirting fabric woven from polyethylene terphthalate (Dacron) filaments is dipped into a 5% aqueous solution of an amine-terminated polyethoxyether (Aston 108, a product of the Onyx Chemical Co. of New Jersey). The fabric is removed, wrung out to a 100% pick-up (based on the dry weight of the fabric sample) and dried in an air circulating oven for two hours at 60° C. The dried fabric is then sprayed with a 5% solution of nitrilotriacetonitrile $N(CH_2C)_3$ in water at 100° C. The sprayed fabric is then placed in a steam cabinet at 120° C. for four hours. The fabric is then removed, laundered in a .3% solution of sodium lauryl sulfate at 70° C., rinsed in distilled water, and dried in an air circulating oven at 50° C. The presence of durably retained cross-linked amine polymer is confirmed by nitrogen analysis of the dried treated fabric. The fabric thus obtained shows extremely little tendency to develop a static charge when rapidly rubbed over a glass surface. A control fabric, treated in accordance with this example, except for omission of the nitrilotriaceto nitrile in the aqueous spray, shows the same degree of static build-up as a completely untreated fabric sample; and contains no durably retained nitrogenous polymer.

*Example III*

Polycaprolactam of 1.5 intrinsic viscosity, in the form of 1/10" pellets, is dry blended with 0.3% powdered nitrilotriaceto nitrile. The coated polymer is extruded at 275° C. through a 50 hole orifice and drawn to produce a 220 denier yarn of 4.4 gram per denier tenacity. The yarn is then tested under conditions simulating temperature and humidity of a fiber-reinforced tire operating at high temperatures. Tenacity measurements over a thirty hour cycle in super heated steam at 110° C. are carried out on the yarn prepared in this example, and a control yarn prepared from the same initial polymer by the process of this example except for omission of the nitrilotriaceto nitrile. The sample prepared in accordance with the process of this invention, containing nitrilotriaceto nitrile, averaged in general 18% improvement in retention of tenacity over the control sample. Since it is known that hot wet conditions cause hydrolytic cleavage and concordant weakening of polycaprolactam polymers, the improved strength-retaining properties of the polynitrile treated yarn of this example is explainable on the basis the terminal primary aliphatic amine groups which form during polycaprolactam hydrolysis are re-joined by the polynitrile. This mechanism is affirmed by the infra red spectrophotometric analysis of the nitrile-contacted, steam-treated yarn; which indicates the absence of nitrile groups.

*Example IV*

Five hundred parts of an amine-terminated polyethylene glycol having an average molecular weight of about 4000 are mixed with 50 parts of iminodiaceto nitrile and 100 parts of water. The mixture is heated at 95° C. for three hours in a stirred resin kettle under a stream of nitrogen saturated with moisture. Ammonia is removed by the exiting nitrogen gas. The temperature is elevated to 145° C. for one hour, during which time the mixture thickness and expands due to the formation of trapped gas bubbles. The polymer composition is cooled and washed with distilled water. The polymer is elastomeric and no longer soluble in water. Analysis of the product reveals the presence of amide groups and the absence of nitrile groups.

*Example V*

A worsted woolen suiting fabric is sharply creased by steam pressing. The creased portion of the fabric is then sprayed along about half its length with a 3% aqueous solution of nitrilotriaceto nitrile at 105° C. The sprayed fabric is then placed for two hours in a steam cabinet containing superheated steam at 115° C. and ammonia at a partial pressure of 5 mm. Hg. The fabric is then air dried, and dry cleaned in a standard Stoddard Solvent formulation containing .4% Streets 888 detergent and 2% of solubilized water, followed by centrifugal extraction and tumble drying. The extent of crease retention in the nitrile treated and untreated length of the crease is compared by subjective visual inspection. The nitrile-treated length of the crease is unmistakably better preserved through the steaming and dry cleaning operation. No residual nitrile groups are detected in the fabric. The crease preserving effect is attributable to a cross-linking of the amine end groups of the protein polymer of wool by the nitrilotriaceto nitrile.

*Example VI*

Five hundred parts of an amine terminated polyethylene glycol having an average molecular weight of about 4000 are mixed with ten parts of N-stearoyl iminodiaceto nitrile, ten parts of ethylene diamine tetraaceto nitrile $(NC—CH_2)_2N—CH_2—CH_2—N(CH_2CN)_2$, and 150 parts of water. The mixture is heated at 95° C. for three hours in a stirred resin kettle under a stream of nitrogen saturated with moisture. Ammonia is removed by the exiting nitrogen gas. The temperature is elevated to 145° C. for one hour, during which time 50 cc. of dimethyl formamide are added to facilitate stirring of the thickened mixture. The polymer composition is cooled and washed with distilled water. The polymer obtained is resistant to most common organic solvents. Analysis of the product reveals the presence of amide groups and the absence of nitrile groups.

*Example VII*

One hundred parts of a water soluble polymer of beta aminoethyl methacrylate are mixed with five parts of a nine mole (average) ethylene oxide adduct of iminodiaceto nitrile $(NC—CH_2)_2N(CH_2—CH_2O)_9H$, one part of ethylenediamine tetraaceto nitrile, and 30 parts water. The mixture is heated at 85° C. with agitation in a resin kettle for three hours, under a blanketing flow of moist nitrogen which removes ammonia. The composition develops an extremely high viscosity and becomes insoluble in water. The reaction is completed and excess water is removed by heating at 135° C. for one hour. The washed, dried product is a hard, water permeable resin, useful as a mildly cationic ion exchange resin.

*Example VIII*

One hundred parts of a water soluble, amine-terminated polyoxyethylene having a molecular weight of about 500, are mixed with ten parts of 1,4 dicyano, 1,4 dihydroxy butane, and 20 parts of water. The mixture is heated at 105° C. in a resin kettle for 36 hours with continuous agitation, employing a blanketing flow of moist nitrogen to remove ammonia and replace water. The product obtained is a water-insoluble elastomeric polyamide which can be drawn into long filaments.

*Example IX*

Two hundred parts of a water soluble polymer of ethylene imine having a molecular weight of about 650, one hundred parts of water, and ten parts of nitrilo triaceto nitrile are continuously agitated in a resin kettle at 45° C. for ten hours. Ammonia is removed, and the mixture gradually thickens to an extremely viscous gel. When thoroughly dried, the gel is permeable to, but insoluble in water. The product removes cations from aqueous solutions, and can be regenerated for further use as an ion exchange resin.

It is thus seen that the process of this invention may be employed either for the preparative synthesis of new organic polymers from lower molecular weight amine-containing polymers, or may be employed for the modification of properties of existing high molecular weight amine-containing polymers of natural or synthetic origin. In general, less than about ten percent of the polynitrile component is required to secure the advantages of this invention. Polymer properties which may be improved by the process of this invention include: solvent resistance, rigidity, hardness, viscosity, and softening point.

Many of the high polymer products and their precursor mixtures of components described herein are novel and useful, and are also encompassed within the scope of this invention.

What is claimed is:

1. A process for converting an amine-containing polymer into a polymer of higher molecular weight comprising contacting a linear organic polymer having a molecular weight of at least 500 and containing at least one aliphatic amine group selected from the group consisting of intralinear and extralinear primary and secondary amino groups, simultaneously with a poly (cyanomethylene) amine and water at elevated temperature in a basic reaction zone, and removing ammonia from said zone as it forms.

2. The process of claim 1 wherein said poly (cyanomethylene) amine is nitrilotriacetonitrile.

3. A process for converting an amine-containing polymer into a polymer of higher molecular weight comprising contacting a linear organic polymer having a molecular weight of at least 500 and containing at least one aliphatic amine group selected from the group consisting of intralinear and extralinear primary and secondary amino groups, simultaneously with a poly (cyanomethylene) amine and water at a temperature between about 45° C. and 290° C. in a basic reaction zone, and removing ammonia from said zone as it forms.

4. The process of claim 1 wherein less than 15% of said poly (cyanomethylene) amine is employed based upon the weight of said polymer.

5. A composition consisting essentially of a polyamide containing at least one aliphatic amine group selected from the group consisting of intralinear and extralinear primary and secondary amine, and 0.1 to 10 percent of nitrilotriacetonitrile, said composition being chemically stable at temperatures below 45° C.

References Cited by the Examiner

UNITED STATES PATENTS

| 2,381,063 | 8/1945 | Kung | 260—78 |
| 2,474,923 | 7/1949 | Watkins | 260—78 |

FOREIGN PATENTS

| 492,442 | 3/1954 | Italy. |

OTHER REFERENCES

Noller-Chemistry of Organic Compounds, 1957, W. B. Saunders Co., Philadelphia, pp. 252–253.

WILLIAM H. SHORT, *Primary Examiner.*

JOSEPH L. SCHOFER, *Examiner.*